United States Patent
Salatino et al.

[11] Patent Number: 5,862,248
[45] Date of Patent: Jan. 19, 1999

[54] INTEGRATED CIRCUIT DEVICE HAVING AN OPENING EXPOSING THE INTEGRATED CIRCUIT DIE AND RELATED METHODS

[75] Inventors: Matthew M. Salatino, Satellite Beach; S. James Studebaker, Palm Bay; Nicolaas W. VanVonno, Melbourne, all of Fla.

[73] Assignee: Harris Corporation, Palm Bay, Fla.

[21] Appl. No.: 671,430

[22] Filed: Jun. 27, 1996

Related U.S. Application Data

[63] Continuation-in-part of Ser. No. 592,472, Jan. 26, 1996.
[51] Int. Cl.$^6$ ..................... G06K 9/28
[52] U.S. Cl. ............ 382/124; 382/312; 438/127
[58] Field of Search ............... 382/116, 124, 382/125, 126, 127, 312, 313, 314, 315; 356/71; 438/15, 51, 55, 64, 60, 112, 116, 119, 124, 126, 127; 324/348, 457; 340/825.34; 361/181; 264/272.17; 364/468.28; 427/96; 399/3; 348/272, 294, 311, 306

[56] References Cited

U.S. PATENT DOCUMENTS

| | | | |
|---|---|---|---|
| 3,781,855 | 12/1973 | Killen | 340/146.3 E |
| 4,312,228 | 1/1982 | Wohltjen | 73/597 |
| 4,336,998 | 6/1982 | Ruell | 356/71 |
| 4,353,056 | 10/1982 | Tsikos | 340/146.3 E |
| 4,394,773 | 7/1983 | Ruell | 382/4 |
| 4,429,413 | 1/1984 | Edwards | 382/4 |
| 4,512,198 | 4/1985 | Sinha et al. | 73/703 |
| 4,526,043 | 7/1985 | Boie et al. | 73/862.04 |
| 4,577,345 | 3/1986 | Abramov | 382/4 |
| 4,581,815 | 4/1986 | Cheung et al. | 29/577 |
| 4,582,985 | 4/1986 | Lofberg | 235/380 |
| 4,684,884 | 8/1987 | Soderlund | 324/73 R |
| 4,761,386 | 8/1988 | Buynoski | 437/203 |
| 4,895,017 | 1/1990 | Pyke et al. | 73/23 |

(List continued on next page.)

FOREIGN PATENT DOCUMENTS

| | | |
|---|---|---|
| 0 040 838 | 12/1981 | European Pat. Off. . |
| 0 041 693 | 12/1981 | European Pat. Off. . |
| 0 044 489 A1 | 1/1982 | European Pat. Off. . |
| 0 459 808 A2 | 12/1991 | European Pat. Off. . |
| 0 513 612 A2 | 11/1992 | European Pat. Off. . |
| 2674051-A1 | 9/1992 | France . |
| 4026-167-A | 5/1991 | Germany . |
| 403036791 A | 1/1991 | Japan . |
| 404190470 A | 7/1992 | Japan . |
| 2 219 870 | 12/1989 | United Kingdom . |
| WO 94/25938 | 10/1994 | WIPO . |

OTHER PUBLICATIONS

R.P. James, *IBM Technical Disclosure Bulletin*, vol. 14, No. 11 (Apr. 1972), "Finger–Print Sensor", p. 3361.

*Primary Examiner*—Leo H. Boudreau
*Assistant Examiner*—Brian P. Werner
*Attorney, Agent, or Firm*—Allen, Dyer, Doppelt, Milbrath & Gilchrist, P.A.

[57] ABSTRACT

An integrated circuit device, such as a fingerprint sensing device, includes an integrated circuit die, a body of encapsulating material surrounding the integrated circuit die and having an opening therein exposing a portion of the integrated circuit die, and an electrically conductive member or frame being mounted to the body of encapsulating material adjacent the opening therein. The electrically conductive member may preferably be positioned so as to define at least a portion of a frame for the opening in the body of encapsulating material. The electrically conductive member may be adhesively secured to the integrated circuit die. Accordingly, the adhesive and electrically conductive member may serve as a seal to the interface between the body of encapsulating material and the die. The electrically conductive member may define a frame that surrounds a body of removable material during an intermediate stage in manufacturing. More particularly, the body of removable material and its frame may be positioned on the integrated circuit die while plastic is injection molded to encapsulate the assembly.

39 Claims, 6 Drawing Sheets

U.S. PATENT DOCUMENTS

| | | | |
|---|---|---|---|
| 5,210,588 | 5/1993 | Lee | 356/71 |
| 5,264,393 | 11/1993 | Tamura et al. | 437/209 |
| 5,325,442 | 6/1994 | Knapp | 382/4 |
| 5,373,181 | 12/1994 | Scheiter et al. | 257/415 |
| 5,400,662 | 3/1995 | Tamori | 73/862.046 |
| 5,424,249 | 6/1995 | Ishibashi | 437/211 |
| 5,429,006 | 7/1995 | Tamori | 73/862.046 |
| 5,488,719 | 1/1996 | Kaplan et al. | 395/600 |
| 5,497,429 | 3/1996 | Shibuya | 382/125 |
| 5,503,029 | 4/1996 | Tamori | 73/862.046 |
| 5,526,701 | 6/1996 | Tamori | 73/862.046 |
| 5,559,504 | 9/1996 | Itsumi et al. | 340/825.3 |
| 5,581,226 | 12/1996 | Shah | 338/42 |
| 5,622,873 | 4/1997 | Kim et al. | 438/65 |
| 5,677,207 | 10/1997 | Ha | 437/21 |
| 5,682,062 | 10/1997 | Gaul | 257/68 G |

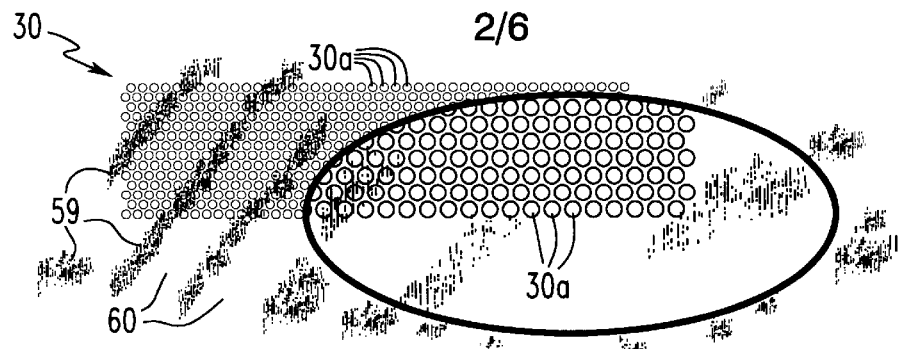
FIG. 4
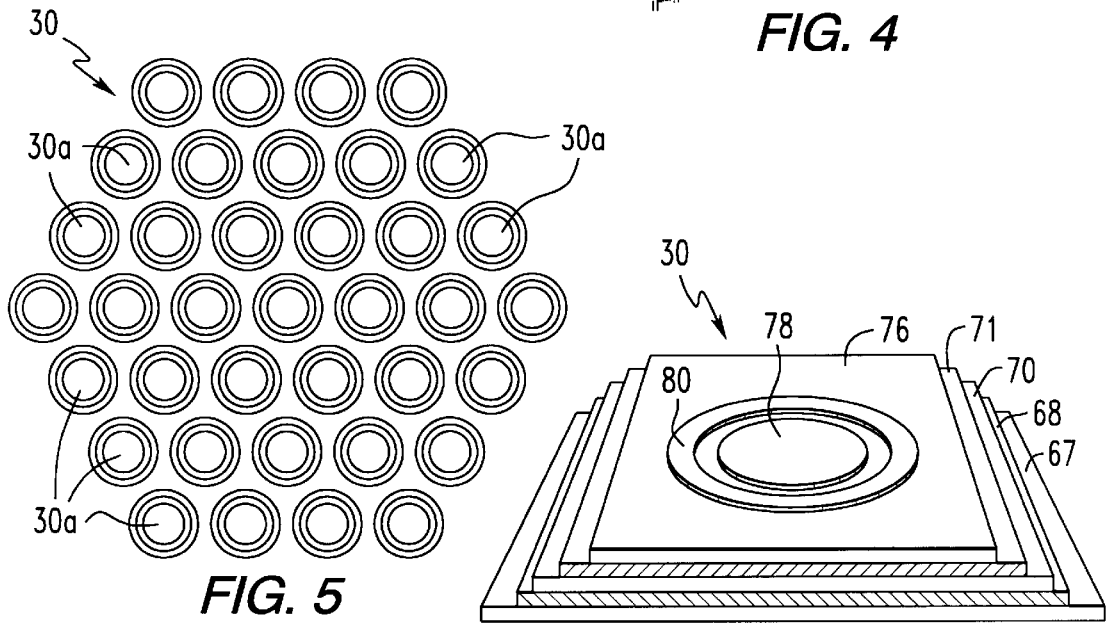
FIG. 5
FIG. 6
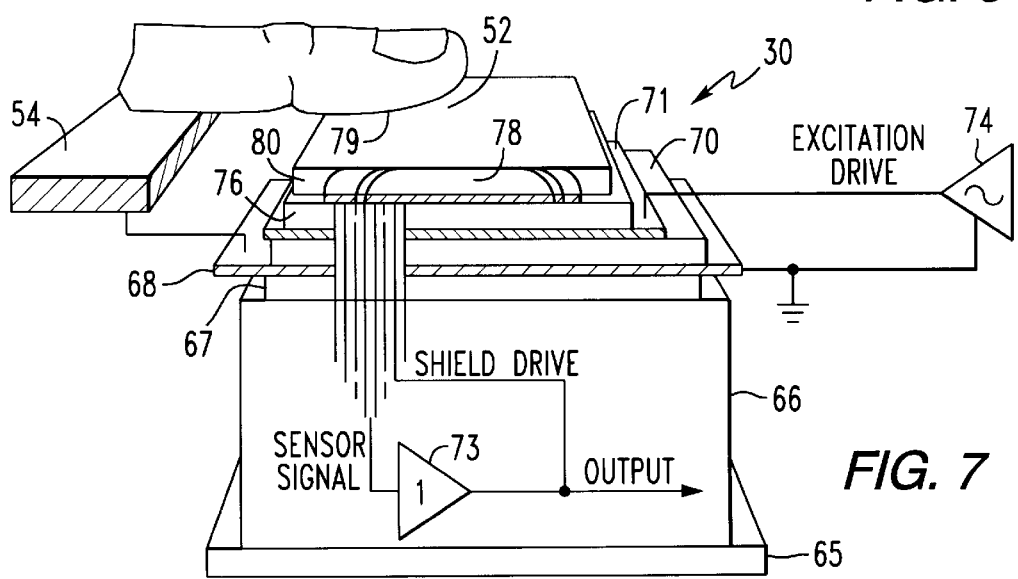
FIG. 7

INTEGRATED CIRCUIT DEVICE HAVING AN OPENING EXPOSING THE INTEGRATED CIRCUIT DIE AND RELATED METHODS

RELATED APPLICATION

This application is a continuation-in-part application of U.S. patent application Ser. No. 08/592,472 filed Jan. 26, 1996.

FIELD OF THE INVENTION

The present invention relates to the field of semiconductors, and, more particularly, to an integrated circuit device and package therefor.

BACKGROUND OF THE INVENTION

Several applications may require that the outermost surface of an integrated circuit die be exposed to the environment, such as to be accessible for direct contact with a person or part of a person. For example, certain medical applications position a bare integrated circuit into the blood stream, such as to measure blood chemistry. Fortunately, in such an application the circuit's operational life is limited, and the circuit is used only once before being discarded. Accordingly, long term reliability is not typically a significant issue.

In contrast, a fingerprint sensor based upon an integrated circuit array of sensing elements may require direct contact by the finger with the integrated circuit die. Fingerprint sensing and matching is a reliable and widely used technique for personal identification or verification. One common approach to fingerprint identification involves scanning a sample fingerprint or an image thereof and storing the image and/or unique characteristics of the fingerprint image. The characteristics of a sample fingerprint may be compared to information for reference fingerprints already in storage to determine proper identification of a person, such as for verification purposes.

A typical electronic fingerprint sensor is based upon illuminating the finger surface using visible light, infrared light, or ultrasonic radiation. The reflected energy is captured with some form of camera, for example, and the resulting image is framed, digitized and stored as a static digital image. For example, U.S. Pat. No. 4,210,899 to Swonger et al. discloses an optical scanning fingerprint reader cooperating with a central processing station for a secure access application, such as admitting a person to a location or providing access to a computer terminal. U.S. Pat. No. 4,525,859 to Bowles similarly discloses a video camera for capturing a fingerprint image and uses the minutiae of the fingerprints, that is, the branches and endings of the fingerprint ridges, to determine a match with a database of reference fingerprints.

Unfortunately, optical sensing may be affected by stained fingers or an optical sensor may be deceived by presentation of a photograph or printed image of a fingerprint rather than a true live fingerprint. In addition, optical schemes may require relatively large spacings between the finger contact surface and associated imaging components. Moreover, such sensors typically require precise alignment and complex scanning of optical beams. Accordingly, optical sensors may thus be bulky and be susceptible to shock, vibration and surface contamination. Accordingly, an optical fingerprint sensor may be unreliable in service in addition to being bulky and relatively expensive due to optics and moving parts.

U.S. Pat. No. 4,353,056 to Tsikos discloses another approach to sensing a live fingerprint. In particular, the patent discloses an array of extremely small capacitors located in a plane parallel to the sensing surface of the device. When a finger touches the sensing surface and deforms the surface, a voltage distribution in a series connection of the capacitors may change. The voltages on each of the capacitors is determined by multiplexor techniques. Unfortunately, the resilient materials required for the sensor may suffer from long term reliability problems. In addition, multiplexing techniques for driving and scanning each of the individual capacitors may be relatively slow and cumbersome. Moreover, noise and stray capacitances may adversely affect the plurality of relatively small and closely spaced capacitors.

U.S. Pat. No. 5,325,442 to Knapp discloses a fingerprint sensor including a plurality of sensing electrodes. Active addressing of the sensing electrodes is made possible by the provision of a switching device associated with each sensing electrode. A capacitor is effectively formed by each sensing electrode in combination with the respective overlying portion of the finger surface which, in turn, is at ground potential. The sensor may be fabricated using semiconductor wafer and integrated circuit technology. The dielectric material upon which the finger is placed may be provided by silicon nitride or a polyimide which may be provided as a continuous layer over an array of sensing electrodes. Further conductors may be provided on the surface of the dielectric material remote from the sensing electrodes and extending over regions between the sensing electrodes, for example, as lines or in grid form, which conductors are grounded in order to improve the electrical contact to the finger surface.

Unfortunately, driving the array of closely spaced sensing electrodes as disclosed in the Knapp et al. patent may be difficult since adjacent electrodes may affect one another. Another difficulty with such a sensor may be its ability to distinguish ridges and valleys of a fingerprint when the conductivity of the skin and any contaminants may vary widely from person-to-person and even over a single fingerprint. Yet another difficulty with such a sensor, as with many optical sensors, is that different portions of the fingerprint may require relatively complicated post image collection processing to provide for usable signal levels and contrast to thereby permit accurate determination of the ridges and valleys of the fingerprint.

Greater advances in fingerprint sensing and matching for identification and verification are desirable and may prevent unauthorized use of computer workstations, appliances, vehicles, and confidential data. Inexpensive and effective fingerprint identification may also be used at point-of-sale terminals, and ensure further security of credit and debit cards, firearms, and provide a personal electronic signature. Unfortunately, current sensors and their associated circuitry may be too bulky, expensive and unreliable for a great many applications which would otherwise benefit from fingerprint identification and verification technology.

Even though several integrated circuit approaches to fingerprint sensing have been described, there are significant difficulties in packaging such a sensor. As mentioned above, direct physical contact with an integrated circuit die is counter to conventional integrated circuit manufacturing and packaging concepts. Water vapor and other contaminants may enter any interface between the integrated circuit die and the surrounding package thereby potentially significantly reducing reliability. Moreover, even if a reliable package were to be designed, low cost mass production techniques would still be desirable for implementing the packaging design. Other sensors and integrated circuit devices may also desirably benefit from packaging advances which provide an integrated circuit device including a package which exposes the integrated circuit die, yet which provides environmental protection for other portions of the die, such as the bond pads and bond wires.

SUMMARY OF THE INVENTION

In view of the foregoing background, it is therefore an object of the present invention to provide an integrated circuit device and related methods permitting direct contact of the integrated circuit die by the sensed medium, such as the finger of a user, for example, and while providing a reliable environmental seal for the die.

It is another object of the present invention to provide such an integrated circuit device and related methods which facilitate large scale and relatively low cost manufacturing.

These and other objects, advantages and features of the present invention are provided in one embodiment by a fingerprint sensing device comprising an integrated circuit die, a body of encapsulating material surrounding the integrated circuit die and having an opening therein exposing a fingerprint sensing portion of the die, and an electrically conductive member or frame being mounted to the body of encapsulating material adjacent the opening therein. The electrically conductive member may preferably be positioned so as to define at least a portion of a frame for the opening in the body of encapsulating material. In one embodiment, the electrically conductive member may have a closed geometric shape and define a complete frame for the opening.

The electrically conductive member may be adhesively secured to the integrated circuit die. Accordingly, the electrically conductive member, and adhesive may serve to seal the interface between the body of encapsulating material and the die. The electrically conductive member may define a frame that surrounds a body of removable material during an intermediate stage in manufacturing. More particularly, the body of removable material and its frame may be positioned on the integrated circuit die while plastic is injection molded to encapsulate the assembly. The body of removable material may then be removed thereby forming the opening in the body of encapsulating material and leaving the electrically conductive frame secured to the surrounding body of encapsulating material. In this embodiment, the electrically conductive member defines a frame during manufacturing and facilitates formation of the opening to expose the adjacent portion of the integrated circuit die. The electrically conductive member may also be part of the circuitry of the integrated circuit device.

The integrated circuit device may preferably include interconnection means for electrically connecting the electrically conductive member to the integrated circuit die. For example, the interconnection means may include an electrically conductive adhesive between the electrically conductive member and the integrated circuit die, and at least one conductor filled via in the integrated circuit die.

For a fingerprint sensing embodiment of the invention, the integrated circuit die may comprise an electric field fingerprint sensor. More particularly, the electric field fingerprint sensor may preferably comprise an array of electric field sensing electrodes, a dielectric layer adjacent the electric field sensing electrodes, and drive means for applying an electric field drive signal to the electric field sensing electrodes and adjacent portions of the finger so that the electric field sensing electrodes produce a fingerprint image signal.

Accordingly, the electrically conductive member may serve as an electrode for the fingerprint sensing portion.

Another aspect of the present invention is based upon the user contacting the integrated circuit device, such as to sense a fingerprint. Since the electrically conductive member is contacted by the finger of the user, voltage clamping means is preferably operatively connected to the electrically conductive member for clamping a voltage thereof to remove electrostatic buildup to thereby protect the integrated circuit device from electrostatic discharge damage and/or to protect the user from electrical shock when contacting the integrated circuit device.

The integrated circuit die preferably further comprises a plurality of bond pads. Accordingly, the body of encapsulating material preferably covers the plurality of bond pads. In addition, bond pad sealing means may be provided for protecting the plurality of bond pads from corrosion. Each of the bond pads may comprise a first metal layer, such as comprising aluminum. Accordingly, the bond pad sealing means may comprise a barrier metal layer on the first metal layer. The bond pad sealing means may further comprises a layer of gold on the barrier metal layer. The bond pad sealing means may be used with the electrically conductive member providing a frame and sealing the interface with the die. Alternatively, in some embodiments the bond pad sealing means may be used without the electrically conductive member or frame member.

The body of encapsulating material preferably comprises injection molded plastic. Locking means is preferably defined at an interface between the electrically conductive member or frame member and the body of encapsulating material for forming a mechanical lock therebetween. Corrosion sensing means may be associated with the integrated circuit die to provide a further backup to ensure reliability such as by indicating the integrated circuit's feasible end of life. The integrated circuit device may also comprise a lead frame connected to the integrated circuit die. In addition, the electrically conductive member may comprise a metal, such as gold, for example. The integrated circuit die preferably comprises a robust outermost passivating layer of at least one of a nitride, carbide, or diamond, for example.

Another aspect of the invention is that the integrated circuit die may comprise a relatively rigid substrate, such as a silicon substrate, and a plurality of metal layers on the substrate. The metal layers are preferably relatively thin and relatively rigid to provide additional strength to the integrated circuit die, since the die is typically touched by the user. Preferably each of the plurality of metal layers comprises a refractory metal, such as tungsten, molybdenum, or titanium. Considered another way, according to this aspect of the invention each of the plurality of metal layers is preferably devoid of relatively soft aluminum.

A method aspect according to the present invention is for making an integrated circuit device. The method preferably comprises the steps of: providing an integrated circuit die; positioning a body of removable material on the integrated circuit die; forming a body of encapsulating material around the integrated circuit die and the body of removable material; and removing the body of removable material to define an opening through the body of encapsulating material to expose a portion of the integrated circuit die. The integrated circuit die may be a sensor, such as a fingerprint sensor, or other integrated circuit device.

The method may further comprise the step of securing a frame member to the body of removable material. The frame member may comprise an electrically conductive material.

In addition, the step of removing the body of removable material preferably includes removing same while the frame member remains in place with the body of encapsulating material. The step of positioning the body of removable material preferably includes the step of adhesively securing the frame member to the integrated circuit die. The step of forming the body of encapsulating material may include injection molding plastic around the body of removable material and the integrated circuit die. In addition, the body of removable material may preferably be a body of material soluble in liquid, and wherein the step of removing preferably includes exposing the body of material to the liquid solvent.

Another method aspect of the invention is for making an integrated circuit device comprising the steps of: providing an integrated circuit die; positioning a mold having a body and a protrusion extending outwardly therefrom on the integrated circuit die so that the protrusion contacts a portion of the integrated circuit die; and positioning encapsulating material within the mold and surrounding the integrated circuit die. The method also preferably includes the step of removing the mold including the protrusion to define an opening through the body of encapsulating material to thereby expose a portion of the integrated circuit die.

BRIEF DESCRIPTION OF THE DRAWINGS

FIG. 4 is a schematic plan view of a portion of the integrated circuit fingerprint sensor and an overlying fingerprint pattern in accordance with the present invention with a portion thereof greatly enlarged for clarity of illustration.

FIG. 5 is a greatly enlarged plan view of a portion of the integrated circuit fingerprint sensor in accordance with the invention with the upper dielectric layer removed therefrom for clarity of illustration.

FIG. 6 is a schematic perspective view of a portion of the integrated circuit fingerprint sensor in accordance with the present invention.

FIG. 7 is a schematic fragmentary view of a portion of the integrated fingerprint sensor in accordance with the present invention.

DETAILED DESCRIPTION OF THE PREFERRED EMBODIMENTS

Figure 1:
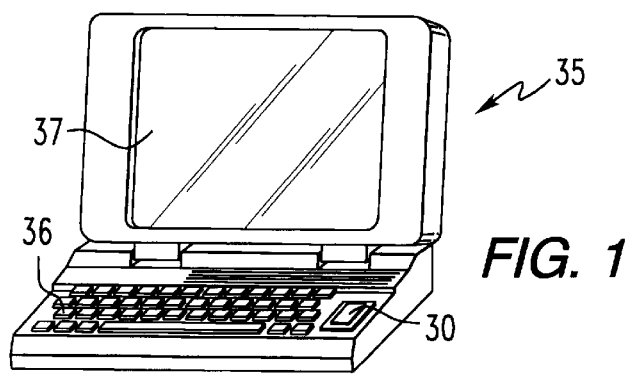
FIG. 1 is a schematic diagram of an integrated circuit fingerprint sensor in combination with a notebook computer in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used in alternate embodiments to indicate similar elements. The scaling of various features, particularly fingers and layers in the drawing figures, have been exaggerated for clarity of explanation.

Figure 2:
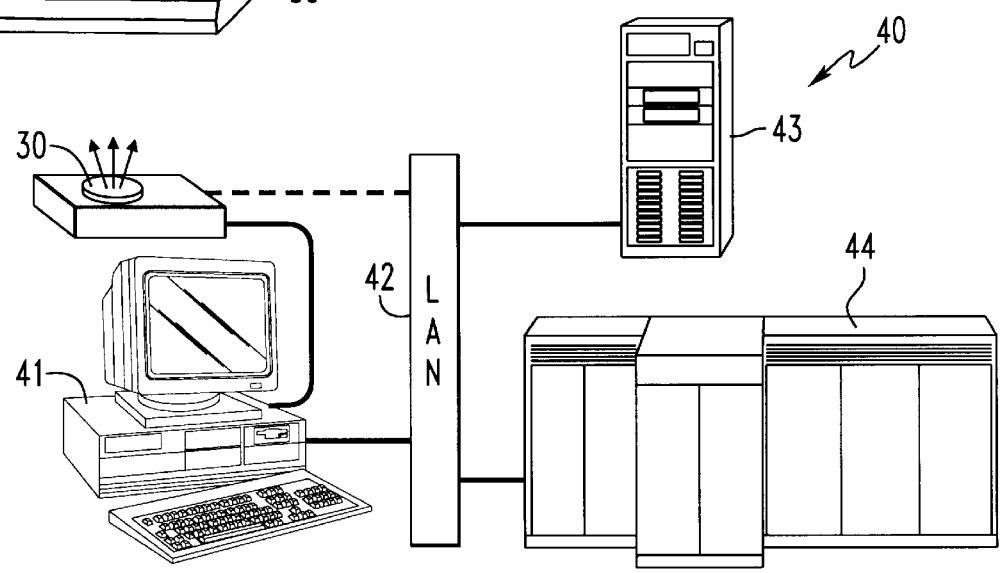
FIG. 2 is a schematic diagram of an integrated circuit fingerprint sensor in combination with a computer workstation and associated information processing computer and local area network (LAN) in accordance with the present invention.
Figure 3:
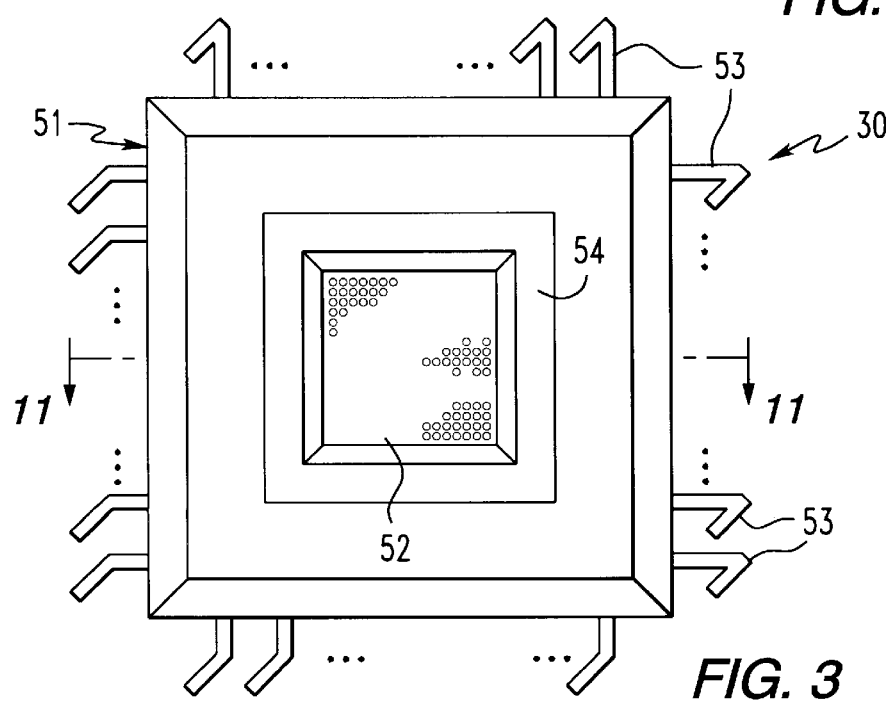
FIG. 3 is a schematic perspective view of an embodiment of an integrated circuit fingerprint sensor in accordance with the invention.

Referring first to FIGS. 1–3, an integrated circuit fingerprint sensor 30 in accordance with the invention is initially described. The illustrated fingerprint sensor 30 includes a housing or package 51, a dielectric layer 52 exposed on an upper surface of the package which provides a placement surface for the finger, and a plurality of signal conductors or leads 53. A conductive strip or electrode 54 around the periphery of the dielectric layer 52 may also provide a contact electrode for the finger as described in greater detail below. The sensor 30 may provide output signals in a range of sophistication levels depending on the level of processing incorporated in the package as also described in greater detail below.

The integrated circuit fingerprint sensor 30 may be used in many different applications as will be readily appreciated by those skilled in the art, such as for personal identification or verification purposes. For example, the sensor 30 may be used to permit access to a computer workstation, such as a notebook computer 35 including a keyboard 36 and associated folding display screen 37 (FIG. 1). In other words, user access to the information and programs of the notebook computer 35 may only be granted if the desired or previously enrolled fingerprint is first sensed as also described in greater detail herein.

Another application of the fingerprint sensor 30 is illustrated with particular reference to FIG. 2. The sensor 30 may be used to grant or deny access to a fixed workstation 41 for a computer information system 40. The system may include a plurality of such workstations 41 linked by a local area network (LAN) 43, which in turn, is linked to a fingerprint identification server 43, and an overall central computer 44. Many other applications for the low cost and reliable electric field sensor 30 in accordance with the invention are contemplated by the invention and will be readily appreciated by those skilled in the art.

Referring now additionally to FIGS. 4–10, the fingerprint sensor 30 in accordance with one aspect of the invention is described in greater detail. The fingerprint sensor 30 includes a plurality of individual pixels or sensing elements 30a arranged in array pattern as shown perhaps best in FIGS. 4 and 5. As would be readily understood by those skilled in the art, these sensing elements are relatively small so as to be capable of sensing the ridges 59 and intervening valleys 60 of a typical fingerprint (FIG. 4). As will also be readily appreciated by those skilled in the art, live fingerprint readings as from the electric field sensor 30 in accordance with the present invention may be more reliable than optical sensing, because the conduction of the skin of a finger in a pattern of ridges and valleys is extremely difficult to simulate with a fingerprint image on a substrate or even with a three-dimensional model of a fingerprint, for example.

The fingerprint sensor 30 includes a substrate 65, and one or more active semiconductive layers 66 thereon. In the illustrated embodiment a ground plane electrode layer 68 is above the active layer 66 and separated therefrom by an insulating layer 67. A drive electrode layer 71 is positioned over another dielectric layer 70 and is connected to an excitation drive amplifier 74. The excitation drive signal may be typically in the range of about 1 Khz to 1 Mhz and is coherently delivered across all of the array. Accordingly, the drive or excitation electronics are thus relatively uncomplicated and the overall cost of the sensor 30 may be reduced, while the reliability is increased.

Another insulating layer 76 is on the drive electrode layer 71, and an illustratively circularly shaped sensing electrode 78 is on the insulating layer 76. The sensing electrode 78 may be connected to sensing electronics 73 formed in the active layer 66 as schematically illustrated, and as would be readily appreciated by those skilled in the art.

An annularly shaped shield electrode 80 surrounds the sensing electrode 78 in spaced relation therefrom. As would be readily appreciated by those skilled in the art the sensing electrode 78 and its surrounding shield electrode 80 may have other shapes, such as hexagonal, for example, to facilitate a close packed arrangement or array of pixels or sensing elements 30a. The shield electrode 80 is an active shield which is driven by a portion of the output of the amplifier circuit 73 to help focus the electric field energy and, moreover, to thereby reduce the need to drive adjacent electrodes. Accordingly, the sensor 30 permits all of the sensing elements to be driven by a coherent drive signal in sharp contrast to prior art sensors which required that each sensing electrode be individually driven.

Figure 8:
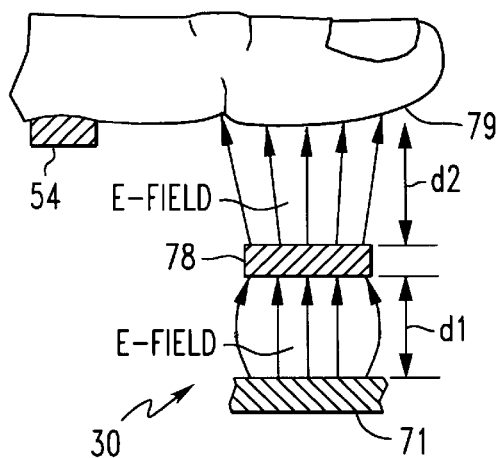
FIG. 8 is a schematic side view, partially in section, illustrating the electric fields in accordance with the present invention.
Figure 9:
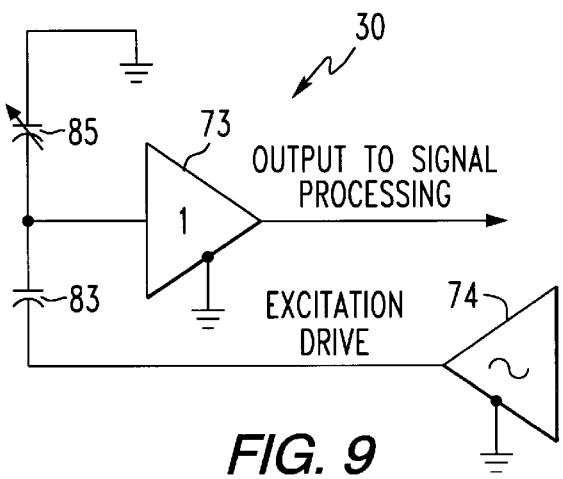
FIG. 9 is a schematic circuit diagram of a portion of the integrated fingerprint sensor in accordance with the present invention.
Figure 10:
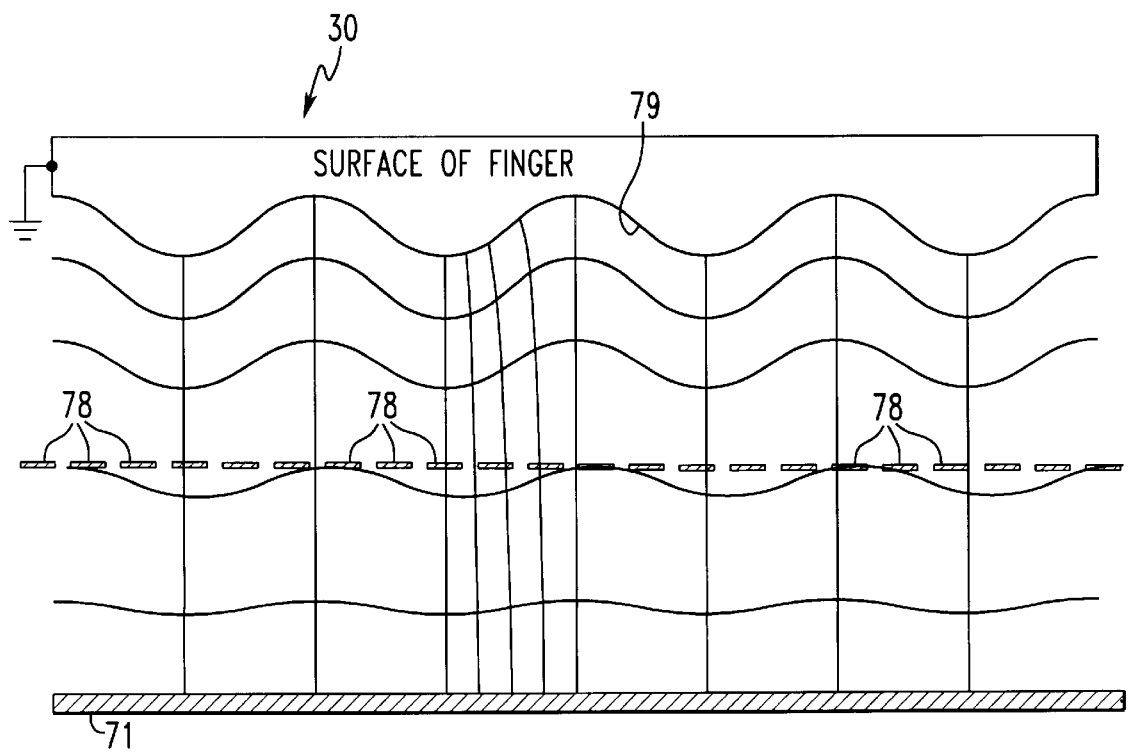
FIG. 10 is an enlarged schematic side view, partially in section, further illustrating the electric fields in accordance with the present invention.

As understood with additional reference to FIGS. 8–10, the excitation electrode 71 generates a first electric field to the sensing electrode 78 and a second electric field between the sensing electrode 78 and the surface of the finger 79, over the distances d1 and d2, respectively. In other terms, a first capacitor 83 (FIG. 9) is defined between the excitation electrode 71 and the sensing electrode 78, and a second capacitor 85 is defined between the finger skin 79 and ground. The capacitance of the second capacitor 85 varies depending on whether the sensing electrode 78 is adjacent a fingerprint ridge or valley. Accordingly, the sensor 30 can be modeled as a capacitive voltage divider. The voltage sensed by the unity gain voltage follower or amplifier 73 will change as the distance d2 changes.

In general, the sensing elements 30a operate at very low currents and at very high impedances. For example, the output signal from each sensing electrode 78 is desirably about 5 to 10 millivolts to reduce the effects of noise and permit further processing of the signals. The approximate diameter of each sensing element 30a, as defined by the outer dimensions of the shield electrode 80, may be about 0.002 to 0.005 inches in diameter. The excitation dielectric layer 76 and surface dielectric layer 52 may desirably have a thickness in the range of about 1 $\mu$m. The ground plane electrode 68 shields the active electronic devices from the excitation electrode 71. A relatively thick dielectric layer 67 will reduce the capacitance between these two structures and thereby reduce the current needed to drive the excitation electrode. The various signal feedthrough conductors for the electrodes 78, 80 to the active electronic circuitry may be readily formed as would be understood by those skilled in the art. In addition, the illustrated signal polarities may be readily reversed as would also be readily understood by those skilled in the art.

The overall contact or sensing surface for the sensor 30 may desirably be about 0.5 by 0.5 inches —a size which may be readily manufactured and still provide a sufficiently large surface for accurate fingerprint sensing and identification. The sensor 30 in accordance with the invention is also fairly tolerant of dead pixels or sensing elements 30a. A typical sensor 30 includes an array of about 256 by 256 pixels or sensor elements, although other array sizes are also contemplated by the present invention. The sensor 30 may also be fabricated at one time using primarily conventional semiconductor manufacturing techniques to thereby significantly reduce the manufacturing costs.

Figure 11:
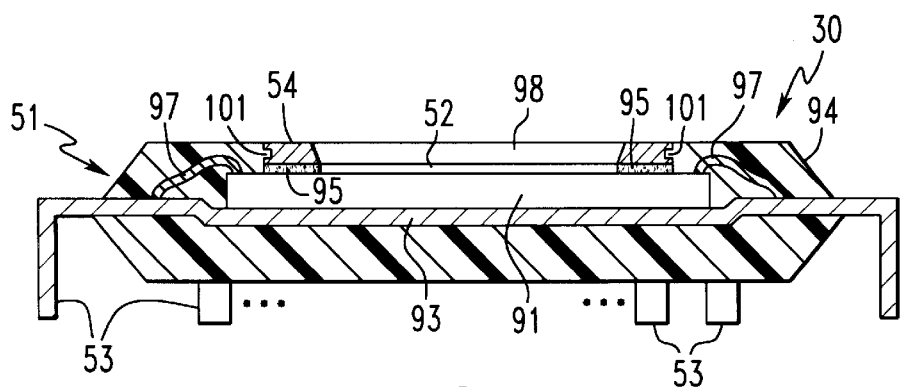
FIG. 11 is a slightly enlarged schematic cross-sectional view taken along lines 11—11 of FIG. 3.

Turning now additionally to FIG. 11 the packaging of the fingerprint sensor 30 is further described. As would be readily understood by those skilled in the art, an integrated circuit fingerprint sensor presents a special packaging difficulty since it has to be touched by the finger being scanned or sensed. It is typically desired to avoid touching of an integrated circuit in conventional integrated circuit fabrication, in part, because of potential contamination. The main contaminants of concern may be sodium and the other alkaline metals. These ionic contaminants have very high mobility in the $SiO_2$ layers that are typically used to passivate the integrated circuit. The resulting oxide charge may degrade device characteristics especially in MOS technology.

One conventional approach to controlling mobile ionic contamination uses hermetic packaging with a phosphorus-doped passivation layer over the integrated circuit. The phosphorus doping reduces contaminant mobility by trapping mechanisms as would be readily understood by those skilled in the art. Plastic packaging has now become more widespread, and a silicon nitride or silicon carbide passivation layer may be used with the plastic packaging. Silicon nitride or silicon carbide may greatly reduce the permeability to contaminants to permit direct contact between the finger of the user and the integrated circuit. Accordingly, silicon nitride or silicon carbide may preferably be used as an outermost passivation layer of the fingerprint sensor 30 in accordance with an embodiment of the present invention.

An integrated circuit device, such as the fingerprint sensor 30, also raises several unique packaging requirements including: the package needs to be open to enable finger-to-sensor die contact; the package should be physically strong in order to withstand rough use; the package and die should be able to withstand repeated cleaning with detergent and/or disinfectant solutions, and including scrubbing; the die should be able to withstand contact with a wide variety of organic and inorganic contaminants, and should be able to withstand abrasion; and finally the package should be relatively inexpensive.

The illustrated package 51 addresses these packaging issues. The package 51 includes an integrated circuit die 91 mounted on a lead frame 93 during injection molding to form the body 94 of encapsulating material of the package. Connections are made by bond wires 97 and the lead frame 93 to the outwardly extending leads 53 as would be readily understood by those skilled in the art. The upper surface of the package 51 includes an integrally molded opening 98 which direct permits contact to the die 91. More particularly, the opening 98 is defined in the illustrated embodiment by a frame member or electrically conductive member which serves as an electrode 54. The electrode 54 is illustratively connected to the underlying portion of the die 91 by an electrically conductive adhesive 95 which provides advantages in manufacturing of the sensor 30 as explained in greater detail below.

The inner exposed sides of the electrode 54 may be slightly angled as shown in the illustrated embodiment. As also shown in the illustrated embodiment, the frame member or electrode 54 is mechanically held in position within the body 94 of surrounding encapsulating material by an interlocking fit between a tongue of plastic material and a corresponding groove in the electrode. Of course, those of skill in the art will recognize other arrangements of interlocking means at the interface between the body 94 and the electrode 54.

Figure 12:
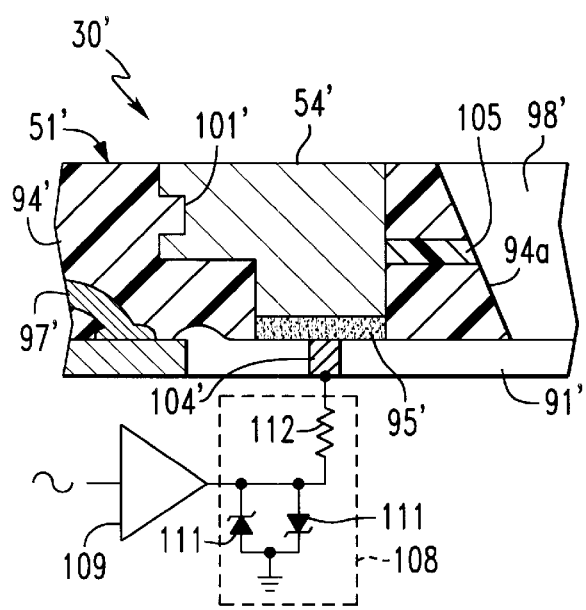
FIG. 12 is a greatly enlarged schematic cross-sectional view of a portion of an alternate embodiment of an integrated circuit device according to the invention.

As will be readily appreciated by those skilled in the art, the electrode 54 may be advantageously interconnected to circuitry within the integrated circuit die 91. In particular with reference additionally to FIG. 12, a conductor filled via 104 may be used to connect to the electrode 54'. As also shown in FIG. 12, an alternate mechanical locking arrangement is illustrated at the interface between the body 94' of encapsulating material and the electrode 54'. The illustrated electrode 54' has an L-shaped cross-section and those of skill in the art will readily appreciate that other cross-sectional shapes are possible and are contemplated by the present invention.

In addition, FIG. 12 illustrates an embodiment of the invention wherein the electrode 94' is set back from the opening 98'. More particularly, a strut 105 may be used to hold a body of removable material to form the opening during molding as described in greater detail below. In other words, one or more struts 105 may define a space between the frame member or electrode 54' and the body of removable material during molding. Accordingly, an inner portion of plastic 94a is formed interior of the electrode 54' during injection molding.

Yet another advantageous feature illustrated in FIG. 12 relates to clamping a voltage at the electrode 54'. More particularly, an electrostatic voltage on the user's finger, if not properly dissipated, may damage components of the integrated circuit die 91' as would be readily understood by those skilled in the art. In addition, a voltage imparted to the electrode 54' from the drive circuitry 109 should desirably not exceed a predetermined level to avoid accidental shocking of the user. Accordingly, the invention advantageously includes the illustrated voltage clamping circuit 108 provided by the illustrated pair of zener diodes 111 and resistor 112. Those of skill in the art will readily appreciate that other clamping circuits are also contemplated by the present invention.

As would be readily appreciated by those skilled in the art, in certain embodiments of the fingerprint sensor or other integrated circuit devices a ground electrode may not be necessary, as the body may serve as a large capacitor itself for the fingerprint sensor. However, the illustrated electrode 54' may still advantageously provide a conductor for contacting the finger to dissipate static discharge in cooperation with the clamping circuit 109. As discussed elsewhere herein, in yet other embodiments of the invention, the electrode 54 may not be needed in the final integrated circuit device.

Figure 13:
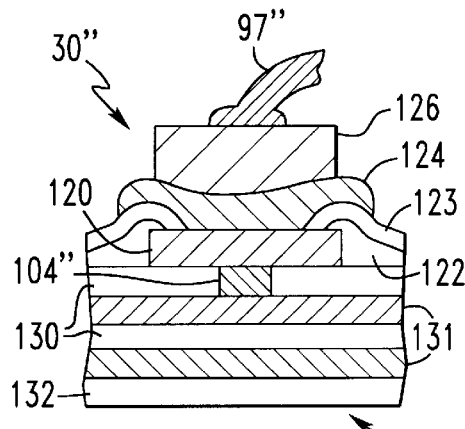
FIG. 13 is a greatly enlarged schematic cross-sectional view of a contact pad portion in an embodiment of the integrated circuit device according to the invention.

Referring now additionally to FIG. 13 another aspect of the invention is explained. Additional bonding pad protection may be provided in certain embodiments of the invention. In the illustrated structure, a bonding pad 120 of aluminum, for example, is formed on an outer surface of the die. A first passivating layer 122 is formed over the upper die surface and covering edge portions of the bond pad 120. A second and preferably thicker passivating layer 123 is applied over the first passivating layer 122. A barrier metal layer 124 is formed on the opening in the second layer 123 and contacts the underlying aluminum bond pad 120. The barrier metal may be an alloy comprising regions of titanium/tungsten; titanium/tungsten nitride; and titanium/tungsten to protect the underlying relatively corrosion susceptible aluminum. A gold layer 126 may be formed over the barrier metal layer 124, and a bond wire 97" connected thereto as would be readily appreciated by those skilled in the art. Those of skill in the art will also readily appreciate other similar structures for protecting the susceptible bond pads 120 from corrosion or degradation as when exposed to water or other contaminants.

The outer passivation layer 123 may comprise silicon nitride for the reasons highlighted above. In addition, another protective coating comprising an organic material, such as polyimide or PTFE (Teflon™) may be provided which yields advantages in wear resistance and physical protection. Inorganic coatings, such as silicon carbide or amorphous diamond, may also be used for the outer layer 123 and may greatly enhance wear resistance, especially to abrasive particles. In addition, the material of the outer passivation layer 123 is preferably compatible with standard integrated circuit pattern definition methods in order to enable bond pad etching, for example.

Yet another significant aspect of the invention understood with reference to FIG. 13 is that the integrated circuit die 91" may include a plurality of metal layers 131 and intervening dielectric layers 130 supported on a relatively rigid silicon substrate 132. Conventional annealed aluminum is typically relatively soft and is deposited with a relatively large thickness. Accordingly, one aspect of the present invention is that the metal layers 131 may be provided by a refractory metal or alloys thereof which may be relatively thin and which are relatively rigid. For example, the refractory metal may include tungsten, molybdenum, titanium or alloys thereof. Other refractory metals, and other non-refractory metals may also be used as long as they are relatively rigid and may be formed in a relatively thin layer. For example, for CVD tungsten the thickness is preferably more than about 0.1 $\mu$m and preferably less than about 1.0 $\mu$m. Considered another way, the metal layers are preferably devoid of aluminum. Thus, the integrated circuit die 91" is more robust to resist damage as may be caused by direct physical contact with a finger of the user, for example.

Figure 14:
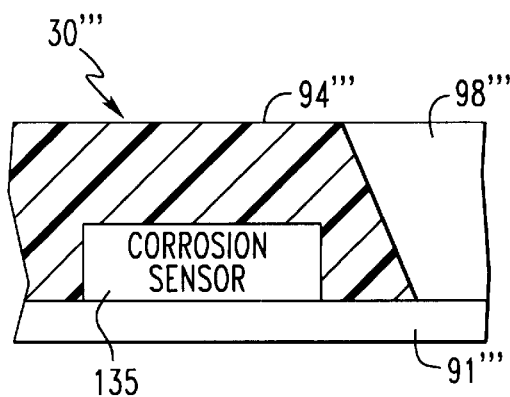
FIG. 14 is a greatly enlarged schematic cross-sectional view of a portion of an alternate embodiment of an integrated circuit device according to the invention.

Those of skill in the art will readily appreciate that the bond pad sealing means disclosed herein and as illustrated in FIG. 13 may be advantageously used in combination with the interface sealing provided by the adhesively secured electrode 54. Those of skill in the art will also recognize that the bond pad sealing means may also be used by itself in certain embodiments, such as shown in FIG. 14 wherein no electrode remains adjacent the opening 98" for either the full extent of the interface or only a part thereof. As also illustrated in FIG. 14, corrosion sensing means 135 may be provided to enable control logic on the integrated circuit die 91'" or remote therefrom to detect corrosion, before failure of the bond pads or other portions of the encapsulated device. The corrosion sensing means 135 may be provided by a resistance network which is periodically monitored for a change in value as would be readily understood by those skilled in the art.

Figure 15:
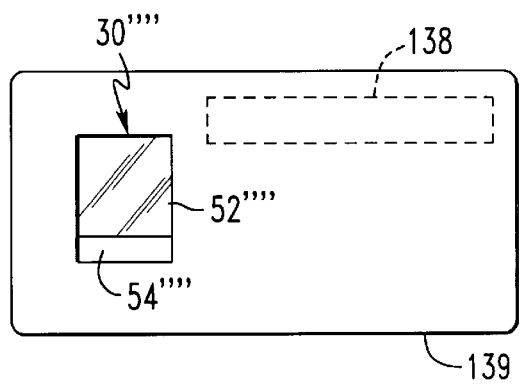
FIG. 15 is a plan view of an integrated circuit fingerprint sensing device incorporated into a carrying card in accordance with the present invention.

Another variation of the fingerprint sensor 30"" is illustrated in FIG. 15 wherein the integrated circuit die is encapsulated within plastic material defining a card 139 for carrying by the user. The illustrated sensor 30"" includes only a single electrode portion 54"" extending along only a portion of the generally rectangular opening. In other embodiments as discussed above, the electrode or frame member may define a closed geometric shape, such as a rectangle. The card 139 may include the illustrated magnetic stripe 138 for carrying data, for example, and which operates in conjunction with the fingerprint sensor 30"" as would also be readily understood by those skilled in the art. The card 139 may also carry one or more other integrated circuit dies to enable data processing and storage, for example, as would also be understood by those skilled in the art.

Figure 16:
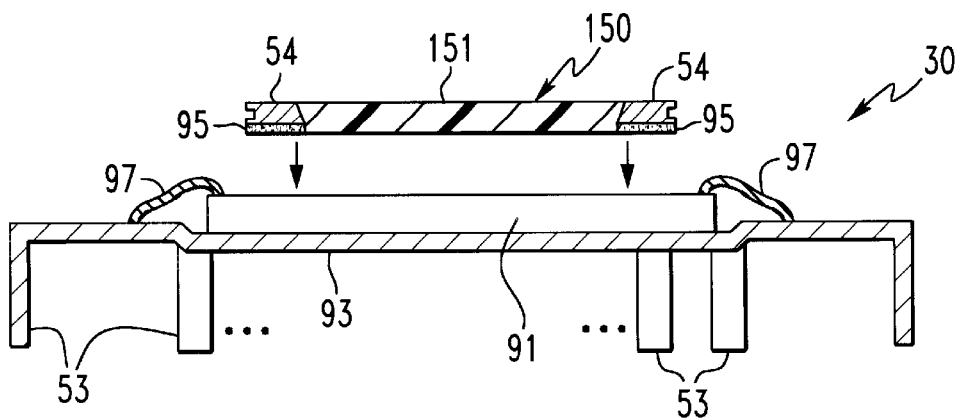
FIGS. 16–18 are schematic cross-sectional views of the integrated circuit device during manufacturing in accordance with a method of the present invention.
Figure 17:
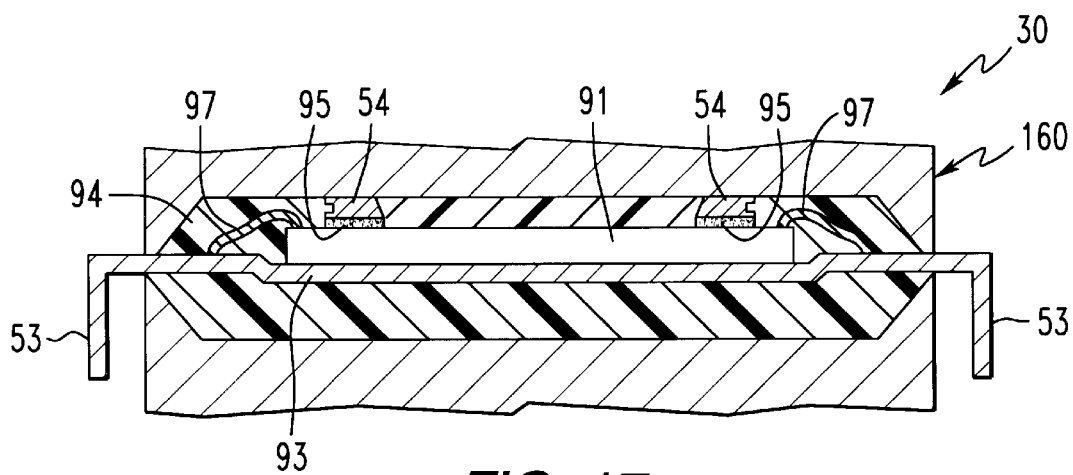
Figure 18:
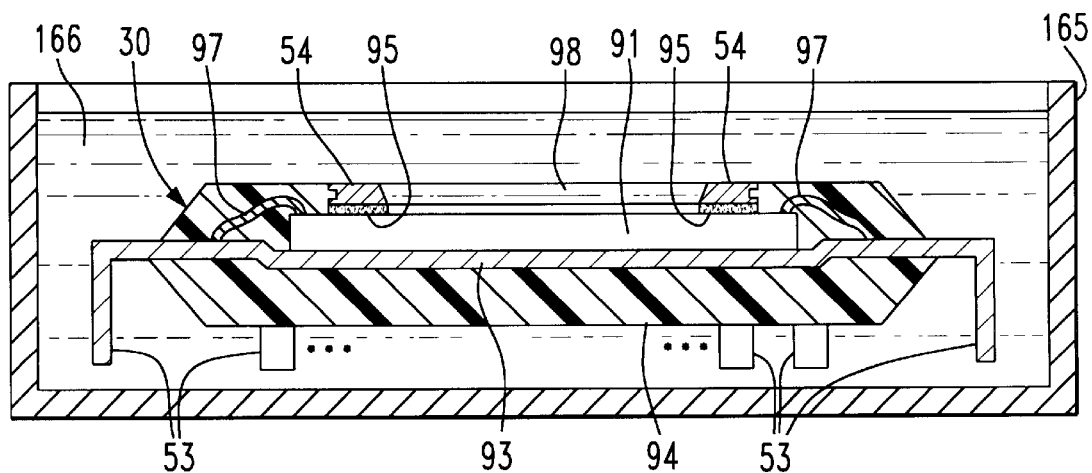

The method aspects of the invention are now explained with reference to FIGS. 16–18. As shown in FIG. 16, an assembly 150 including the electrode 54, a body 151 of removable material, and an adhesive layer 95 on the underside of the electrode is aligned over and positioned onto the integrated circuit die 91 which, in turn, has been secured and connected to the lead frame 93. The thus formed structure is positioned within a conventional integrated circuit package injection mold 160 (FIG. 17) and the body 94 of encapsulating plastic material is formed as would be readily understood by those skilled in the art. As shown in FIG. 18, after removal from the injection mold 160, the structure is positioned in a bath 165 containing a liquid solvent 166, such as water, for example, so that the body of removable material is dissolved away leaving the opening 98 to the underlying portion of the integrated circuit die 91. Those of skill in the art will appreciate many materials that may be readily removed to define the opening. In addition, a solvent spray may be used to dissolve the removable material.

Figure 19:
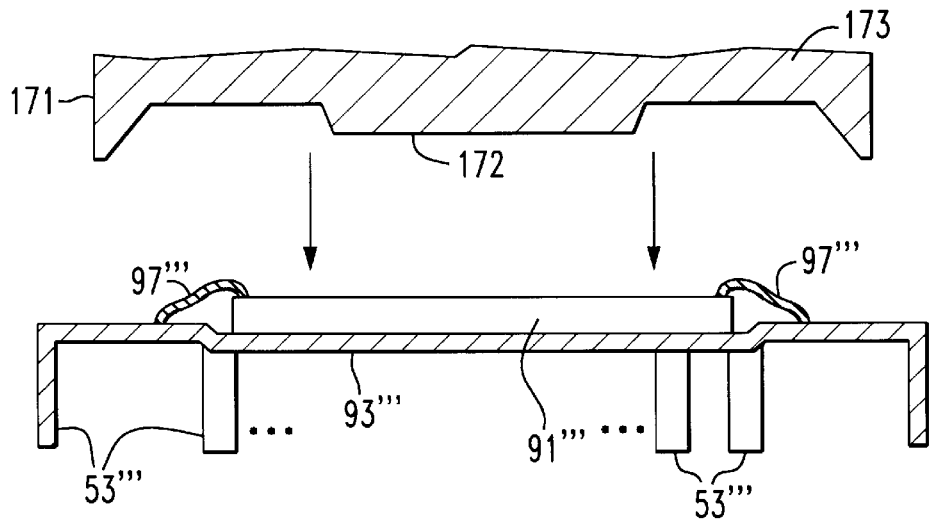
FIGS. 19 and 20 are schematic cross-sectional views of the integrated circuit device during another manufacturing process in accordance with a method of the present invention.
Figure 20:
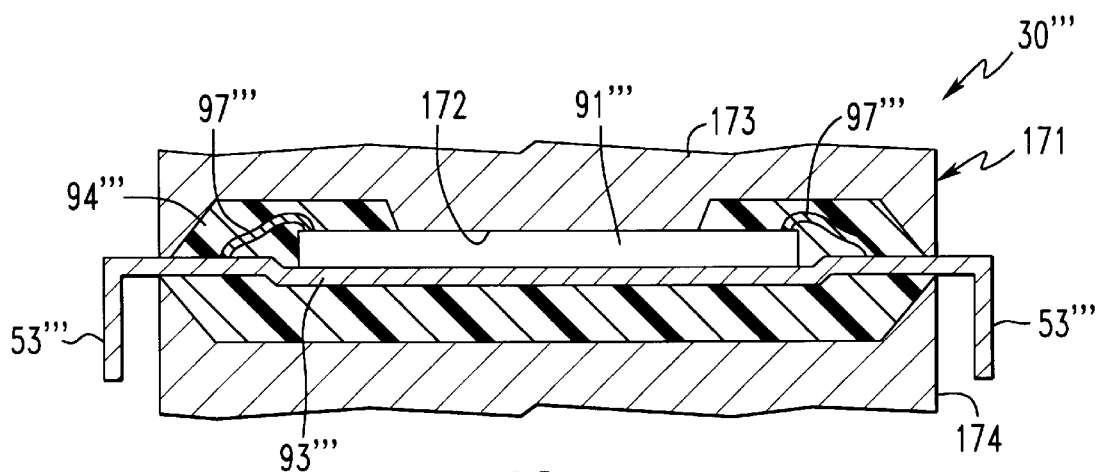

Turning now additionally to FIGS. 19 and 20 another method in accordance with the invention for making the integrated circuit device 30'" (FIG. 14) is now described. In this embodiment, an upper mold portion 171 includes a body 173 and a protrusion 172 extending downwardly therefrom. The upper mold portion 171 is brought together with the lower mold portion 174, and plastic encapsulating material 941'" is injected into thus defined mold cavity as shown in FIG. 20. As would be readily understood by those skilled in the art, the protrusion 172 may be hollow rather than solid as shown in the illustrated embodiment. The other elements are indicated with a triple prime and are similar to those described above.

Provisions may be made to ensure biasing of the protrusion 172 against the integrated circuit die 91 during injection molding as would also be readily understood by those skilled in the art. The upper and lower mold portions may be parted to free the integrated circuit device 30'".

As will be readily appreciated by those skilled in the art, the techniques and structures for defining and sealing an opening to the surface of an integrated circuit die may be used for many integrated circuit devices. The invention is particularly applicable to a fingerprint sensor 30 wherein direct contact with the finger of the user is performed. The invention may also be used for other sensors, such as gas or liquid sensors, wherein direct exposure of the integrated circuit die to the sensed medium is desirable and wherein other portions of the die are desirably protected from such exposure.

The various embodiments of the fingerprint sensor 30 and its associated processing circuitry may implement any of a number of conventional fingerprint matching algorithms. For example, a suitable fingerprint matching algorithm and indexing approach for quick and efficient searching is described in copending patent application entitled "Methods and Related Apparatus for Fingerprint Indexing and Searching", having Ser. No. 08/589,064, assigned to the assignee of the present invention and the entire disclosure of which is incorporated herein by reference in its entirety.

As would be readily understood by those skilled in the art, fingerprint minutiae, that is, the branches or bifurcations and end points of the fingerprint ridges, are often used to determine a match between a sample print and a reference print database. Such minutiae matching may be readily implemented by the processing circuitry of the present invention as would be readily understood by those skilled in the art. For example, U.S. Pat. Nos. 3,859,633 and 3,893,080 both to Ho et al. are directed to fingerprint identification based upon fingerprint minutiae matching. U.S. Pat. No. 4,151,512 to Riganati et al., for further example, describes a fingerprint classification method using extracted ridge contour data. U.S. Pat. No. 4,185,270 to Fischer II et al. discloses a process for encoding and verification also based upon minutiae. In addition, U.S. Pat. No. 5,040,224 to Hara discloses an approach to preprocessing fingerprints to correctly determine a position of the core of each fingerprint image for later matching by minutiae patterns. The entire disclosures of each of these U.S. patents are incorporated herein by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fingerprint sensing device comprising:
   an integrated circuit die comprising a first fingerprint sensing portion for direct contact by a finger of a user, and a second surface portion opposite the first fingerprint sensing portion;
   an integrally molded body of encapsulating material surrounding said integrated circuit die including the second surface portion thereof, said body of encapsulating material having an opening therein exposing the first fingerprint sensing portion of said integrated circuit die to adjacent a periphery of the first fingerprint sensing portion to permit direct contact by the finger of the user with the first fingerprint sensing portion; and
   an electrically conductive member being mounted to said body of encapsulating material adjacent the opening therein and adjacent the first fingerprint sensing portion so that the finger of the user directly contacts the electrically conductive member as the finger is positioned onto the first fingerprint sensing portion.

2. A fingerprint sensing device according to claim 1 wherein said electrically conductive member is positioned so as to define at least a portion of a frame for the opening in said body of encapsulating material.

3. A fingerprint sensing device according to claim 1 wherein said electrically conductive member has a closed geometric shape.

4. A fingerprint sensing device according to claim 1 wherein said electrically conductive member has a generally rectangular shape.

5. A fingerprint sensing device according to claim 1 further comprising interconnection means for electrically connecting said electrically conductive member to said integrated circuit die.

6. A fingerprint sensing device according to claim 5 wherein said interconnection means comprises:
an electrically conductive adhesive between said electrically conductive member and said integrated circuit die;
at least one via in said integrated circuit die; and
electrically conductive material in said at least one via.

7. A fingerprint sensing device according to claim 1 wherein said first fingerprint sensing portion comprises an electric field fingerprint sensor.

8. A fingerprint sensing device according to claim 7 wherein said electric field fingerprint sensor comprises:
an array of electric field sensing electrodes;
a dielectric layer adjacent said electric field sensing electrodes, said dielectric layer for receiving a finger adjacent thereto; and
drive means for applying an electric field drive signal to said electric field sensing electrodes and adjacent portions of the finger so that said electric field sensing electrodes produce a fingerprint image signal.

9. A fingerprint sensing device according to claim 1 further comprising voltage clamping means operatively connected to said electrically conductive member for clamping a voltage thereof.

10. A fingerprint sensing device according to claim 1 further comprising electrostatic discharge means for reducing an electrostatic charge of a user as the finger of the user touches said electrically conductive member.

11. A fingerprint sensing device according to claim 1 wherein said integrated circuit die further comprises a plurality of bond pads, and wherein said body of encapsulating material covers said plurality of bond pads.

12. A fingerprint sensing device according to claim 11 further comprising bond pad sealing means for protecting said plurality of bond pads from corrosion.

13. A fingerprint sensing device according to claim 12 wherein each of said bond pads comprises a first metal layer, and wherein said bond pad sealing means comprises a barrier metal layer on said first metal layer.

14. A fingerprint sensing device according to claim 13 wherein said bond pad sealing means further comprises a layer of gold on said barrier metal layer.

15. A fingerprint sensing device according to claim 1 wherein said integrated circuit die comprises:
a relatively rigid substrate; and
a plurality of metal layers on said substrate and being relatively thin and relatively rigid to provide strength to said integrated circuit die.

16. A fingerprint sensing device according to claim 15 wherein each of said plurality of metal layers comprises a refractory metal.

17. A fingerprint sensing device according to claim 15 wherein each of said plurality of metal layers is devoid of aluminum.

18. A fingerprint sensing device according to claim 1 further comprising a lead frame connected to said integrated circuit die.

19. A fingerprint sensing device according to claim 1 wherein said electrically conductive member comprises metal.

20. A fingerprint sensing device according to claim 1 wherein said integrated circuit die comprises an outermost passivating layer.

21. A fingerprint sensing device according to claim 20 wherein said outermost passivating layer comprises at least one of a nitride, carbide, and diamond.

22. A fingerprint sensing device according to claim 1 further comprising an adhesive layer between said integrated circuit die and said electrically conductive member.

23. A fingerprint sensing device according to claim 1 wherein said body of encapsulating material comprises plastic.

24. A fingerprint sensing device according to claim 1 wherein said body of encapsulating material comprises injection molded plastic.

25. A fingerprint sensing device according to claim 1 further comprising locking means defined at an interface between said electrically conductive member and said body of encapsulating material for forming a mechanical lock therebetween.

26. A fingerprint sensing device according to claim 1 further comprising corrosion sensing means for sensing corrosion of said integrated circuit die.

27. A fingerprint sensing device comprising:
an integrated circuit die comprising a first fingerprint sensing portion for direct contact by a finger of a user, and a second surface portion opposite the first fingerprint sensing portion;
an integrally molded body of encapsulating material surrounding said integrated circuit die including the second surface portion thereof, said body of encapsulating material having an opening therein exposing the first fingerprint sensing portion of said integrated circuit die to adjacent a periphery of the first fingerprint sensing portion to permit direct contact by the finger of the user with the first fingerprint sensing portion; and
an electrically conductive member being mounted to said body of encapsulating material adjacent the opening therein to define at least a portion of a frame for the opening so that the finger of the user directly contacts the electrically conductive member as the finger is positioned onto the first fingerprint sensing portion.

28. A fingerprint sensing device according to claim 27 wherein said electrically conductive member has a closed geometric shape.

29. A fingerprint sensing device according to claim 27 further comprising interconnection means for electrically connecting said electrically conductive member to said integrated circuit die.

30. A fingerprint sensing device according to claim 27 further comprising voltage clamping means operatively connected to said electrically conductive member for clamping a voltage thereof.

31. A fingerprint sensing device according to claim 27 wherein said integrated circuit die further comprises a plurality of bond pads, and further comprising bond pad sealing means for protecting said plurality of bond pads from corrosion.

32. A fingerprint sensing device according to claim 27 wherein said integrated circuit die comprises:
a relatively rigid substrate; and a plurality of metal layers on said substrate and being relatively thin and relatively rigid to provide strength to said integrated circuit die.

33. A fingerprint sensing device according to claim 27 further comprising an adhesive layer between said integrated circuit die and said electrically conductive member.

34. A fingerprint sensing device according to claim 27 further comprising locking means defined at an interface between said electrically conductive member and body of encapsulating material for forming a mechanical lock therebetween.

35. A fingerprint sensing device comprising:

an integrated circuit die comprising a first fingerprint sensing portion for direct contact by a finger of a user, and a second surface portion opposite the first fingerprint sensing portion;

an integrally molded body of encapsulating material surrounding said integrated circuit die including the second surface portion thereof, said body of encapsulating material having an opening therein exposing the first fingerprint sensing portion of said integrated circuit die to adjacent a periphery of the first fingerprint sensing portion to permit direct contact by the finger of the user with the first fingerprint sensing portion;

an electrically conductive member mounted to said body of encapsulating material and adjacent the first fingerprint sensing portion so that the finger of the user directly contacts the electrically conductive member; and voltage clamping means operatively connected to said electrically conductive member for clamping a voltage thereof.

36. A fingerprint sensing device according to claim 35 wherein said voltage clamping means comprises electrostatic discharge means for reducing an electrostatic charge of a user upon the user touching said electrically conductive member.

37. A fingerprint sensing device according to claim 35 wherein said electrically conductive member is positioned so as to define at least a portion of a frame for the opening in said body of encapsulating material.

38. A fingerprint sensing device according to claim 35 wherein said electrically conductive member has a closed geometric shape.

39. A fingerprint sensing device according to claim 35 further comprising an adhesive layer between said integrated circuit die and said electrically conductive member.

* * * * *